United States Patent
Mourgues et al.

(10) Patent No.: US 11,893,006 B2
(45) Date of Patent: Feb. 6, 2024

(54) DATABASE RECORD CONSISTENCY MECHANISMS

(71) Applicant: AMADEUS S.A.S., Biot (FR)

(72) Inventors: Fabien Xavier Mourgues, Roquefort-les-Pins (FR); Mohamed Amine Maaroufi, Antibes (FR); Joseph El Hayek, Antibes (FR)

(73) Assignee: AMADEUS S.A.S., Biot (FR)

( * ) Notice: Subject to any disclaimer, the term of this patent is extended or adjusted under 35 U.S.C. 154(b) by 225 days.

(21) Appl. No.: 17/197,388

(22) Filed: Mar. 10, 2021

(65) Prior Publication Data

US 2022/0292072 A1 Sep. 15, 2022

(51) Int. Cl.
*G06F 7/00* (2006.01)
*G06F 17/00* (2019.01)
*G06F 16/23* (2019.01)

(52) U.S. Cl.
CPC ...... *G06F 16/2365* (2019.01); *G06F 16/2322* (2019.01)

(58) Field of Classification Search
None
See application file for complete search history.

(56) References Cited

U.S. PATENT DOCUMENTS

| | | | | |
|---|---|---|---|---|
| 9,509,701 | B2* | 11/2016 | Wohlert | H04L 63/101 |
| 2019/0286835 | A1* | 9/2019 | Werneke | H04L 67/62 |
| 2020/0117690 | A1* | 4/2020 | Tran | G06F 16/90332 |
| 2020/0314104 | A1* | 10/2020 | Achyuth | G06F 21/6218 |

OTHER PUBLICATIONS

Wang, Jenna. "Marriott Competes Against Airbnb With New Home Rental Venture." Forbes, Forbes Magazine, May 31, 2018, URL: https://www.forbes.com/sites/jennawang/2018/05/31/marriott-competes-against-airbnb-with-new-home-rental-venture/?sh=ab637a05a80c.
Stavreva, Galena, "Peer-to-Peer Travel Marketplaces—How Hotels Can Take Advantage." Insights, Oct. 30, 2018, URL: https://insights.ehotelier.com/insights/2018/10/30/peer-to-peer-travel-marketplaces-how-hotels-can-take-advantage/.
Travel Tech Nation, "Joop." 2020. URL: https://www.traveltechnation.com/companies/joop.

* cited by examiner

*Primary Examiner* — Tuan A Pham
(74) *Attorney, Agent, or Firm* — Perry + Currier (57) ABSTRACT

A database server is communicatively coupled to a database storing multiple data records which are accessible by a number of data access systems communicatively coupled to the database server in order to claim exclusive access to a data record for a specifiable time period by one of the data access systems. The database server stores associations of the data records with the data access systems defining which data access system is generally allowed to access to which data record and an exclusive access times inventory defining which of the data access systems with allowed access has already been granted exclusive access to which data record for which time periods.

15 Claims, 9 Drawing Sheets

| Record ID | Parameter 1 | Parameter 2 | Parameter 3 | Data access system identifiers |
|---|---|---|---|---|
| 000 | ... | ... | ... | A, C |
| 001 | ... | ... | ... | D, C |
| 010 | ... | ... | ... | A, B, C |
| 011 | ... | ... | ... | Any |
| 100 | ... | ... | ... | A, B |
| 101 | ... | ... | ... | A, B |
| 110 | ... | ... | ... | A, B |
| *111* | | | | *A, D* |

DATABASE RECORD CONSISTENCY MECHANISMS

FIELD

The present methodologies relate to database technology. More specifically, they relate to database consistency of multiple stored data records.

BACKGROUND

Database systems usually allow multiple clients to read the same data at the same time, but provide write access only to one client at a time, e.g. by way of write locks, in order to ensure consistency of stored data records. Exclusive write accesses traditionally represent a performance bottleneck as further clients with pending write accesses are queued or restricted from those write accesses as long as a currently writing client has been granted exclusive access to the data records.

SUMMARY

The present methodologies are generally directed to improve known database record consistency mechanisms.

According to a first aspect, a database consistency method is implemented by a database server which is communicatively coupled to a database storing multiple data records. The multiple data records are accessible by a number of data access systems communicatively coupled to the database server in order to claim exclusive access to a data record for a specifiable time period by one of the data access systems. The database server stores associations of the data records with the data access systems defining which data access system is generally allowed to access to which data record and an exclusive access times inventory defining which of the data access systems with allowed access has already been granted exclusive access to which data record for which time periods. In response to receiving a first request from a first data access system of the data access systems requesting exclusive access to a particular data record for a first time period, the database server checks the stored associations to determine whether the first data access system is allowed to access the particular data record. If affirmative, the database server checks whether exclusive access to the particular data record is still available for the first time period. If affirmative, the database server updates the exclusive access times inventory to grant the first data access system exclusive access to the particular data record for the period of time and exclude all other data access systems from access to the particular data record for the first period of time.

According to a second aspect, a database server is provided which is arranged to implement the aforementioned database consistency method.

In line with a third aspect, a computer program with instructions that may be stored on a computer-readable medium is provided. The instructions cause a database server, when executed, to perform the aforementioned database consistency method.

Further refined aspects are set forth by the dependent claims as well as by the detailed description of exemplary embodiments given below.

BRIEF DESCRIPTION OF THE FIGURES

Aspects and examples of the present disclosure are described with reference to the following figures, in which.

DETAILED DESCRIPTION

Figure 1:
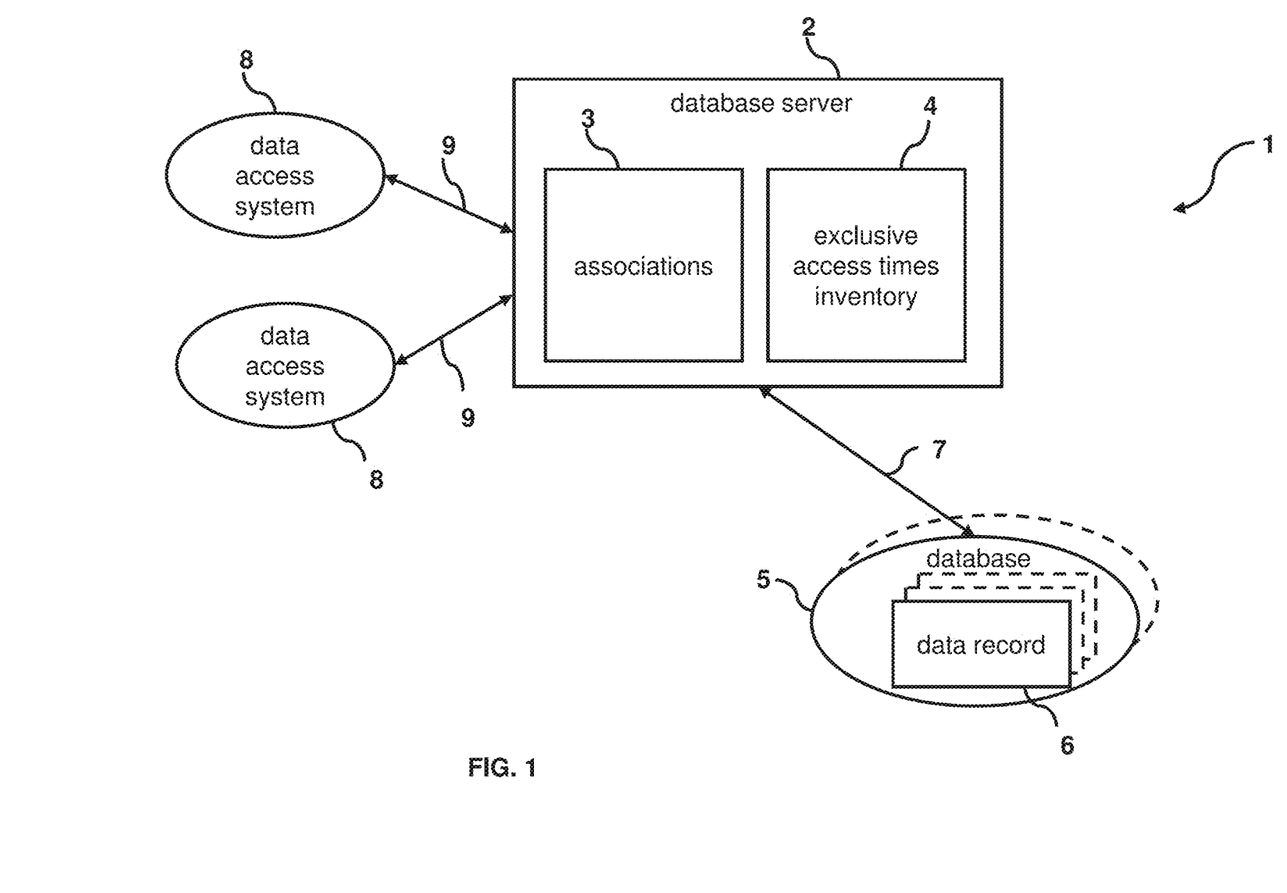
FIG. 1 shows a high-level architecture of a database system employed herein.

A schematic overview of a database system 1 implementing the present methodologies is given by FIG. 1. A database server 2 is communicatively coupled to a database 5 via a communication interface 7. The database 3 may be of any given type such as a relational database, a NoSQL database, a key-value database, a document or XML-based database, an object or object-oriented database and/or others. The database 5 may actually include multiple databases or database instances. The database 5 may be co-located with the database server 2 (e.g. in the same machine, the same room or the same data center) and/or located remotely. Accordingly, the communication interface 7 may include one or more of a bus, a local area network connection, a wide area network connection, a wireless network (such as a 3G/4G/5G network according to ETSI/3GPP specifications and/or a WiFi/WLAN network according to IEEE specifications), the Internet.

The database 5 stores multiple data records 6 which are accessible, such as retrievable and changeable, via the database server 2, by multiple data access systems 8 that are communicatively coupled to the database server 2. The data access systems 8 may be client systems such as workstations, mobile terminals, and applications, and/or server systems such as other database systems or webservers.

The database server 2 is arranged to receive and process database requests from the data access systems 8. More specifically, the database server 2 processes database responses which include at least one request parameter, usually multiple request parameters indicated in the database requests. The database requests may be read requests and/or write requests. The database server 2 is communicatively coupled to the data access systems 8 by way of communication interface(s) 9. The communication interface(s) 9 may utilize one or more local area networks and/or wide-area networks such as the Internet, personal access networks such as Bluetooth-based connections, and also the aforementioned communication technologies such as a 3G/4G/5G network and/or a WiFi/WLAN network.

Generally, the database requests and the data records stored by the database 3 of the database system 1 may relate to any type of content. The methodologies described herein generally apply to any content stored by the database system 1 and sought or addressed by the database requests. Some exemplary use cases are set forth further below in order to explain the methodologies of the present disclosure. The methodologies may pertain to further use cases in a similar manner as well.

Generally, database systems employ techniques to ensure the ACID characteristics (Atomicity, Consistency, Isolation, Durability). Particularly, consistency in database systems refers to the requirement that any given database transaction changes the data records concerned only in allowed ways. Any data written to the database should be valid according to all defined rules, including constraints, cascades, triggers, and any combination thereof. Potential conflicts may arise when multiple data access systems 8 concurrently request write accesses to the same (or overlapping) data records.

In this respect, to promote data consistency, the present methodologies provide a mechanism to grant exclusive access to data records 6 to individual data access systems 8 for certain periods of time. The multiple data records 6 stored by the database 5 are generally accessible by the data access systems 8 in order to claim exclusive access to one or more data records 6 for a specifiable time period by one of the data access systems 8. The database server 2 manages the accesses of the data access systems 8 by way of at least two types of access control information. On the one hand, the database server 2 stores associations 3 of the data records 6 with the data access systems 6 defining which data access system 6 is generally allowed to access to which data record 6. On the other hand, the database server 2 stores an exclusive access times inventory 4 defining which of the data access systems 8 with allowed access as specified by the associations 3 has already been granted exclusive access to which data record 6 for which time periods.

The associations 3 and/or the exclusive access times inventory 4 may be stored by the database server 2 itself, or be stored remotely (e.g. at one or more different servers) accessible by the database server 2.

Both, the associations 3 and the exclusive access times inventory 4 are utilized by the database server 2 in order to grant or deny access to data records 6 in response to database requests. This is, at a more general level of abstraction, visualized by FIG. 2. In response to receiving a first request 10A from a first data access system 8A of the data access systems 8 requesting exclusive access to a particular data record 6A (meaning one or more requested data records 6A stored in the database 5) for a first specified time period T1, the database server 2 checks the stored associations 3 to determine 11 whether the first data access system 8A is generally allowed to access the particular data record 6A. To this end, the first request 10A (also referred to as access request) indicates at least an identity of the requesting data access system 8A, the particular data record 6A and the first time period T1. If affirmative. i.e. the database server 2 determines that the first data access system 8A is generally allowed to access the particular data records 6A, the database server 2 checks 12, based on the exclusive access times inventory 4, whether exclusive access to the particular data record is still available for the specified first time period T1. If affirmative, the database server 2 updates 13 the exclusive access times inventory 4 to grant the first data access system 6A exclusive access to the particular data record 8A for the specified period of time and exclude all other data access systems 8B from access to the particular data record 6A for the specified first period of time T1.

Figure 2:
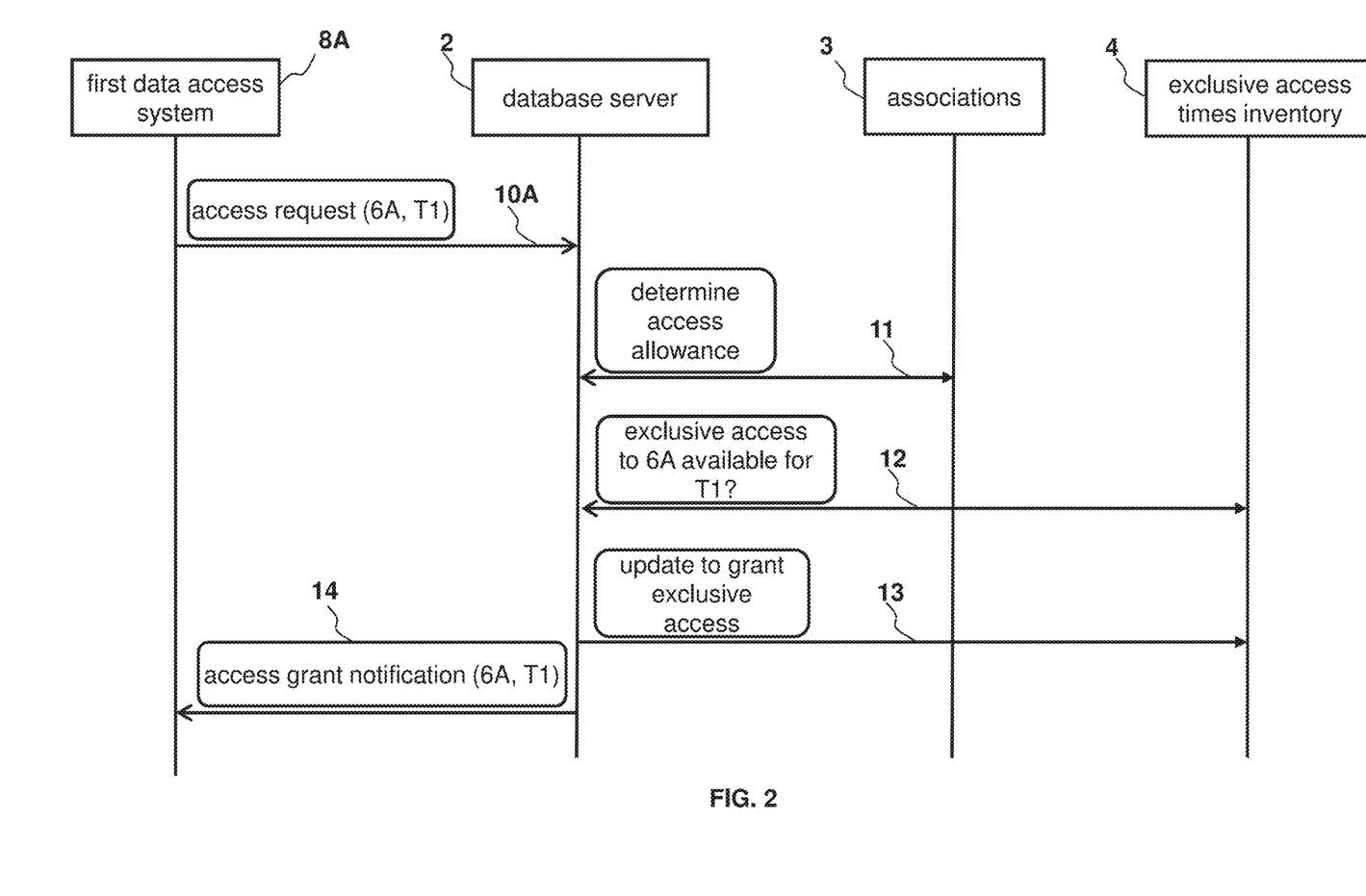
FIG. 2 is a message chart visualizing activities of a data consistency procedure.

In some embodiments, the database server 2 returns an access grant notification 14 to the first data access system 8A informing the first data access system 8A that exclusive access to the particular data record 6A has been granted for the first time period T1. The first data access system 8A is then enabled to modify or update the particular data records 6A during the time interval T1 by one or more corresponding write requests, while other data access systems 8B are excluded from any write accesses to the particular data record 6A during the first period of time T1.

In some embodiments, the write requests of the first data access system 8A may be routed via the database server 2 in order to ensure that the write requests have previously granted by way of the procedure according to FIG. 2. To this end, in response to receiving a write request from the first data access system 8A, the database server 2 consults the exclusive access times inventory 4 and verifies that the first data access system 8A was previously granted exclusive access to the particular data record 6A during the first time interval T1. If affirmative, the write request from the first data access system 8A is allowed by the database server 2.

Figure 3:
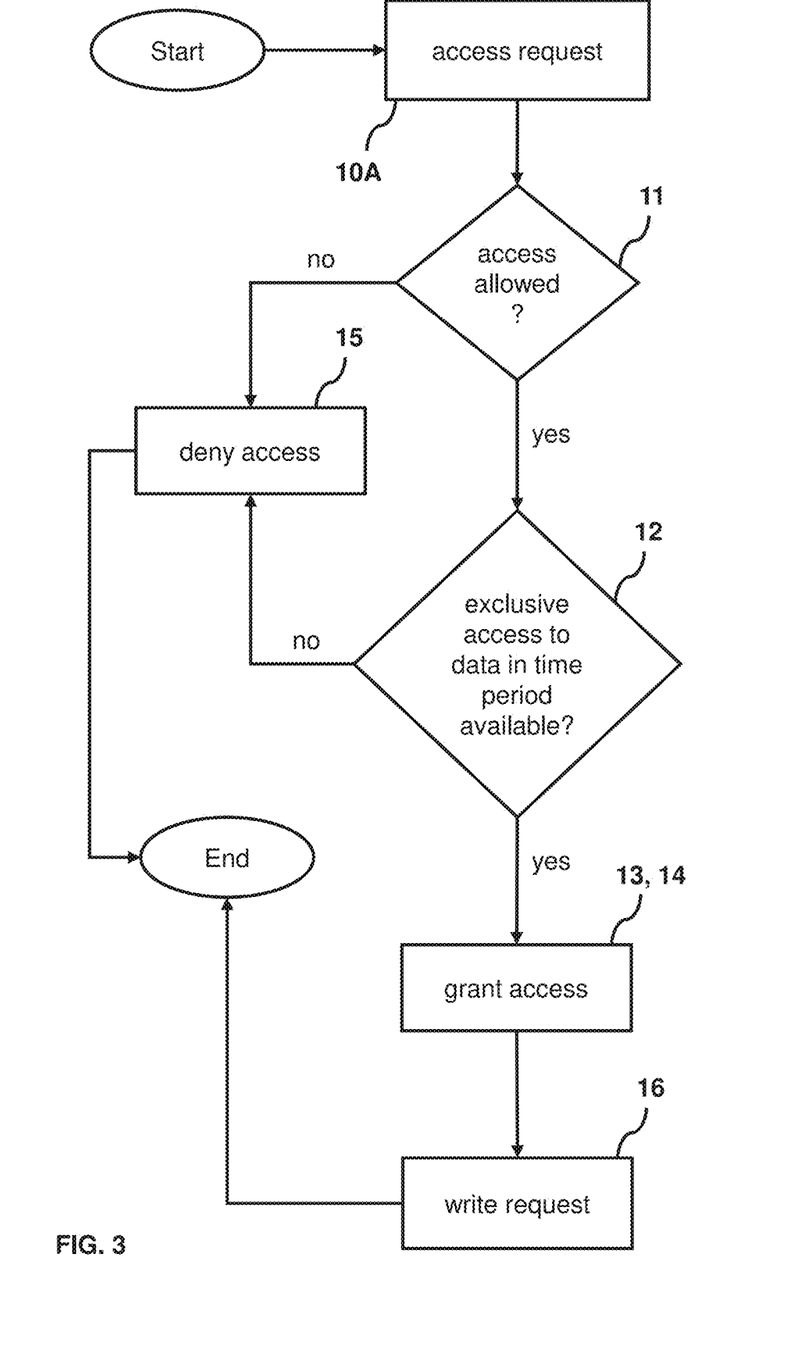
FIG. 3 is a flow chart that visualizes further activities of the data consistency procedure.

A flow diagram visualizing further optional branches of the procedure is given by FIG. 3. After receiving an access request 10A from a data access system 8, the database server 2 determines 11 with the associations 3 whether or not the data access system 8 is generally allowed to access the data record(s) 6. In response to determining that the data access system 8 is not allowed to access the data record(s) 6 ("no"), the database server 2 denies access 15 to the requested data record(s) 6. Access denial 15 may be effected by returning a denial message to the requesting data access system 8.

In response to determining that the data access system 8 is generally allowed to access the data record(s) ("yes"), the database server consults the exclusive access times inventory 4 to determine 12 whether exclusive access to the data record(s) during the first time period is still available. In response to determining that exclusive access to the data record(s) during the first time interval is not available anymore ("no"), in particular because exclusive access to the data record(s) has already been given to another data access system 8, the database server 2 denies access 15 to the data record(s). Again, denial 15 may be effected by returning a denial message to the requesting data access system 8.

In response to determining that exclusive access to the data record(s) during the first time interval is still available ("yes"), the database server grants access 13, 14 to the data access system to modify the data record(s) during the first time period. As mentioned above, access grant comprises updating 13 the exclusive access times inventory 4 to mark that exclusive access to the data record(s) for the duration of the first time has been given to the requesting data access system 8A, thereby excluding other data access system 8B from any write accesses to the data record(s) during the first time interval. Access grant may also comprise returning an access grant notification 14 to the requesting data access system 8.

During the first time period, the database server 2 may receive a number of write requests 16 from the data access system 8 to modify the data record(s). The database server 2 checks with the exclusive access times inventory 4 and confirms that the data access system 8 has previously been granted exclusive access to the data record(s) during the first time period. Accordingly, write requests 16 from the data access system 8 are allowed by the database server 2 (e.g. by routing through these requests to the database 5).

The present mechanisms provide data consistency by ensuring exclusive access (such as write accesses) to one or more data records 6 by one data access system 8A during a given time period, in particular for the event that a second data access 8B requests exclusive access to at least one of the one or more data records 6 for a at least a sub-period of the given time period. In response to receiving a second request from a second data access system 8B of the data access systems 8 requesting exclusive access to the particular data record 6A for at least a first sub-period of the first specified time period, the database server 2 determines, based on the updated exclusive access times inventory 4 that exclusive access is not available for the first sub-period of the specified first time period and returns a denial response to the second data access system 8.

Figure 4:
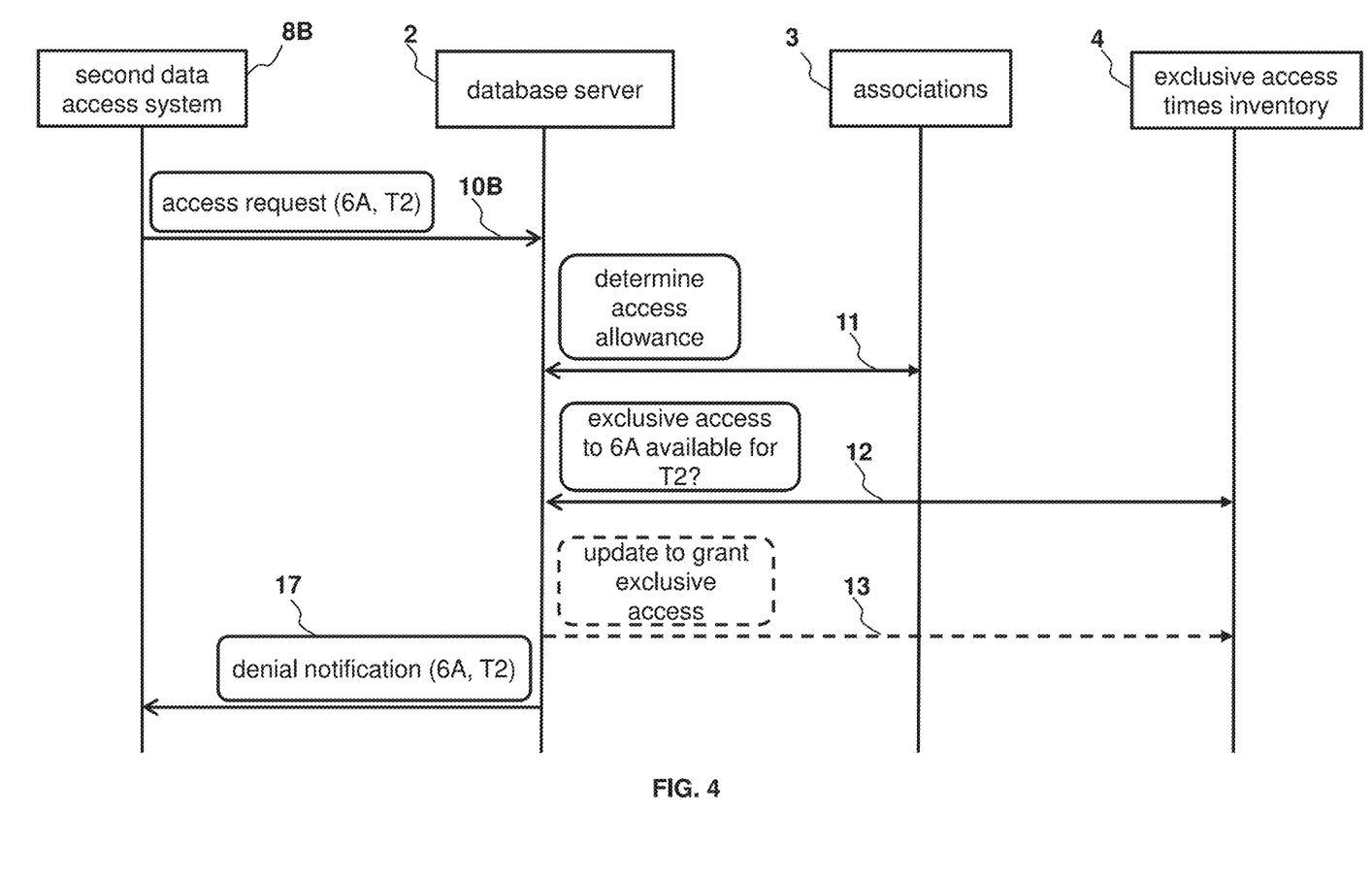
FIG. 4 is a message chart visualizing still further activities of the data consistency procedure.

This situation is visualized by FIG. 4, the message exchange of which occurs after the message sequence of FIG. 2. The database server 2 receives a second request 10B from the second data access system 8B. Similar to the first request 10A, the second request 10B indicates at least the identity of the requesting second data access system 8B, the particular data record 6A to which access is requested, and the requested (second) time period T2. As mentioned above, according to the present exemplary situation, the second time period T2 includes at least a sub-period of the first time period T1. Hence, both time periods T1 and T2 may be overlapping such that the second period T2 covers a portion of the first time period T1. The second time period T2 may also be a true sub-portion of the first time period T1 or may, coincidentally, by equal to the first time period T1.

In response to receiving the second request 10B, the database server 2 first checks, based on the associations 3, whether the second data access system 8B is generally allowed to access the particular data record 6A. If affirmative, the database server 2 checks, based on the previously updated exclusive access times inventory 4, whether exclusive access to the particular data record 6A is still available for the specified second time period T2. According to the aforementioned assumption according to which the second time period T2 includes at least a sub-period of the first time period T1, the database server 2 determines that exclusive access to the particular data records 6A has already been granted to another data access system, namely the first data access system 8A, for at least a portion of the second time period T2. Hence, the database server 2 is unable to grant exclusive access to the particular data record 6A to the second data access system 8B for the requested time period. As a result, in some embodiments, the database server 2 returns a denial notification 17 to the second data access system 8B to indicate refusal of the second request 10B.

Generally, in this way, the database server 2 is able to block any data access system 8 from conflicting accesses to data records such as write requests 16 during time periods for which exclusive access has already granted to a data access system. Utilizing access requests indicating time periods and data records provides a time-period-based access management that resolves conflicting write requests already at a logically higher or earlier layer (access layer), avoiding issuance of write requests which are to be refused due to a currently activated lock already in the first place. In this way, the present mechanisms may contribute to a reduction of data record access traffic. Checks for general allowance facilitate efficient access management, as potentially costly (in terms of computation resources and response times) consultations of the exclusive access times inventory 4 can be avoided for generally unallowed data access systems 8.

Note that non-conflicting accesses to the data records may still exist outside the present regime. For example, read requests may occur and be granted at any time, irrespective of the entries in the exclusive access times inventory 4, i.e. access exclusion refers to write requests, but not to read requests. In other examples, the data access systems 8 which are excluded from access to the particular data record 6 for the first period of time may not able to read or see the particular data record 6. In these or further examples, an ownership concept may be implemented by the present mechanisms, i.e. exclusive access means that the first data access system 8A claims ownership of the particular data record 6 for the granted period of time, while other data access systems 8B are excluded from at least one of manipulating, reading, seeing, copying, sending, printing, and other sorts of reproducing or utilizing the particular data record 6. Hence, particularities of exclusive access to the first data access system 8A and excluded access of other data access systems 8B are subject to the particular use case implementing the present methodologies.

Furthermore, the database system 1 may comprise data access systems 8 which do not operate according to the present mechanisms. For example, the database system 1 may include data access systems 8 of various types, wherein data access systems 8 of a first type operate according to the present mechanisms, while data access systems 8 of a second type are allowed to attempt accesses to the data records 6 at all times, without having applied for an exclusive access grant for a certain time period before.

Figure 5:
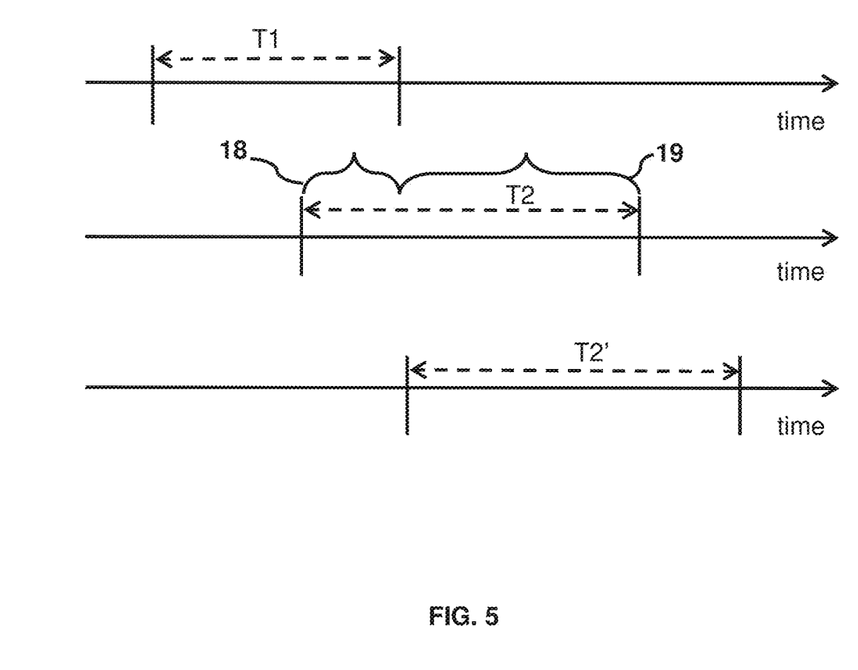
FIG. 5 shows various time periods for which exclusive access to data records may be requested.

Some embodiments provide further optional refinements on top of the scenario of FIG. 4. For example, the denial notification 17 may include an indication of one or more sub-periods of the specified second time period during which exclusive access is still available according to the exclusive access times inventory. With reference to FIG. 5, the first data access system 8A has already granted exclusive access to the particular data record(s) 6 for the first time period T1. The second data access system 8B requests exclusive access to the particular data record(s) 6 for the second time period T2 which, in the non-limiting example of FIG. 5, partially overlaps with the first time period T1. The database server 2 may determine this by way of the exclusive access check 12 (FIG. 4).

The database server 2 then may deny exclusive access to the particular data record(s) 6 for the overlapping time sub-period 18, i.e. the denial notification 17 may indicate the overlapping time period 18 as being refused. However, the access request of the second data access system 8B may be granted with respect to the non-overlapping time sub-period 19. Hence, as indicated in FIG. 4 (dotted, i.e. optional, activity 13), in this situation, the database server 2 updates 13 the exclusive access times inventory 4 and enters the second data access system 8B as having been granted exclusive access during the non-overlapping time sub-period 19. Further, in addition to the denial notification 17, the database server 2 then returns an access grant notification 14 to the second data access system 8B with respect to the non-overlapping time sub-period 19. Note that both notifications 17 and 14 may be returned to the second data access system 8B in a single message.

In some embodiments, access grant for the non-overlapping time sub-period 19 is effected in response to a further follow-up (third) access request from the second data access 8B. For example, the denial notification 17 may indicate the overlapping time sub-period 18 and/or the non-overlapping time sub-period 19, thereby enabling the second data access system to prepare the follow-up access request for an adjusted second time period T2' (FIG. 5) which excludes the overlapping time sub-period 18 from the access request. Assuming that, in the meantime, no other data access system 8 has been granted exclusive access to the particular data record(s) for any sub-period of the adjusted second time period T2', the follow-up access request by the second data access system 8B is granted by the database server 2 similar to the process of FIG. 2 already described above.

Depending on the specific use case, the database server 2 and the data access systems 8 may employ a certain granularity of time for managing exclusive access to the data records 6. For example, in some embodiments, the minimum time unit of time periods is a second, i.e. a data access may request exclusive access to a data record for a number of seconds. In other embodiments, the minimum time unit is minutes, hours or days.

Figure 6:
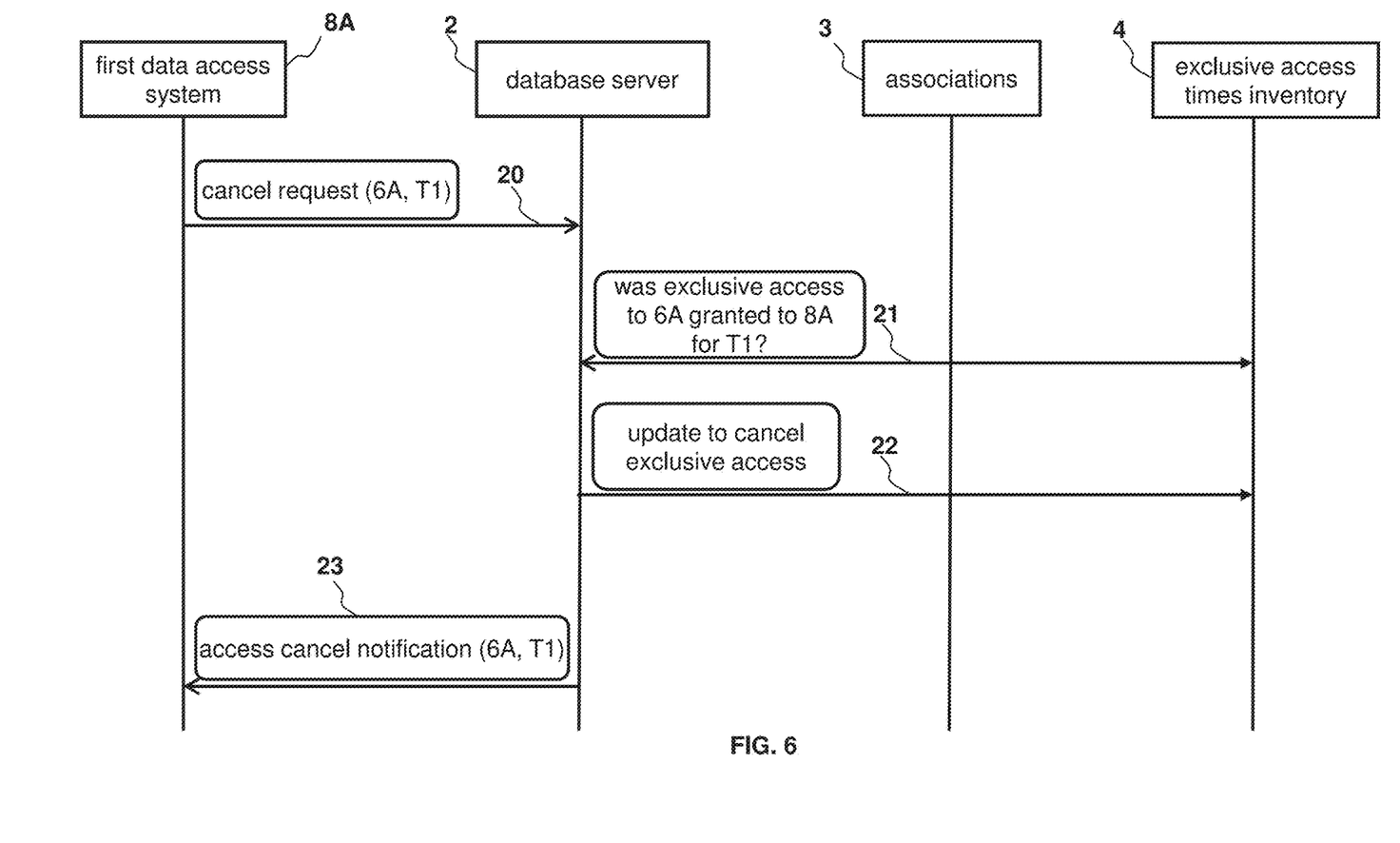
FIG. 6 is a message chart visualizing still further activities of the data consistency procedure.

Similar to the methodologies described with reference to FIGS. 2 to 4, exclusive access grants may be cancelled again (FIG. 6). In this regard, the data access system 8 sends an access cancellation request 20 which is received by the database server 2. The access cancellation request 20 includes at least an indication of the granted exclusive access which is to be cancelled, e.g. the time period and the data record, such as exclusive access to the first data access system 8A for the particular data record(s) 6A and the first time period T1. In response to receiving the access cancellation request 20, the database server 2 consults 21 the exclusive access inventory 4 to determine if exclusive access to database record(s) 6A was previously granted to the data access system 8A for the time period T1. If the previously granted exclusive access indicated by the access cancellation request is found in the exclusive access inventory 4, the database server 2 updates 22 the exclusive access inventory accordingly, i.e. deletes the previously granted exclusive access from the exclusive access inventory 4, thereby cancelling the previously granted exclusive access again. Note that activities 21 and 22 may also be implemented by a single message to the exclusive access times inventory 4. The database server 2 may confirm the cancellation by way of an access cancellation notification 23 returned to the data access system 8.

Figure 7:
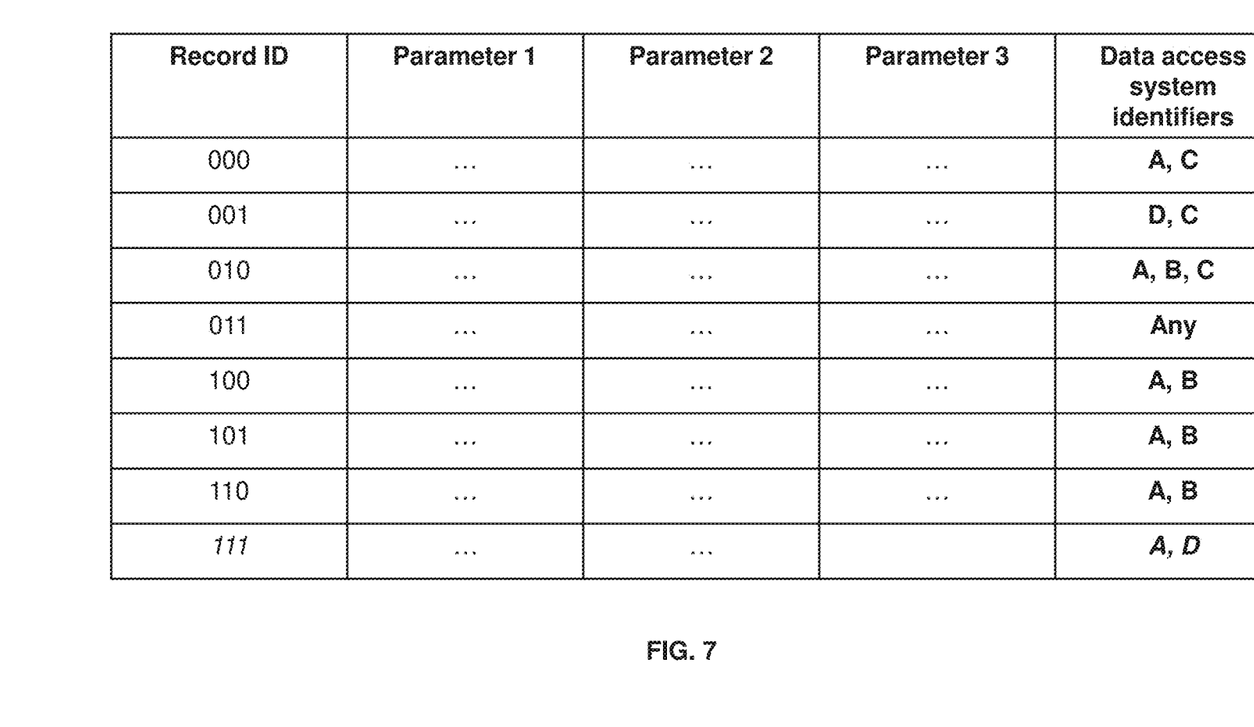
FIG. 7 depicts an implementation example of associations defining data access systems which are generally allowed to access data records.

Further optional details of the associations 3 are described with reference to FIG. 7. For example, in some embodiments, the associations 3 are stored as one or more data access system identifiers within a data structure of the data records, wherein each data access system identifier indicates one of the data access systems that is allowed to generally access the respective data record. This is visualized by FIG. 7 which shows a simplified excerpt of a number of data records 6 stored by the database 5. A data record includes a record identifier (ID), a number of parameters (three parameters in the non-limiting example of FIG. 7) and a field holding the data access system identifiers. For example, the data records with the identifier '100', '101' and '110' are generally accessible by the data access systems A and B (e.g. the aforementioned first and second data access systems 8A and 8B as referred to by FIGS. 2 to 6), while other data records are defined as being accessible by other data access systems 8. The data access system(s) 8 generally allowed to access data record 6 may be specified by enumerated value(s), such as an identity of the respective data access system. This is also referred to as multi-tagging since each data record may include multiple data access system identifiers (tags). The identifiers may also specify pre-defined groups of data access systems 8. For example, the data record with the ID '011' is defined as generally accessible by any data access system 8 of the database system 1.

In some embodiments, after an initial storage of the particular data record 6A in the database, the associations 3 are updated to define which of the data access systems 8 is allowed to generally access the particular data record 6A based at least on association criteria prescribed by the data access systems 8. For example, at some point of time, an additional data record with the identifier '111' with values for three parameters is stored in the database 5 (visualized in FIG. 7 by italics). The database 5 and/or the database server 2 then determine(s) which of the data access systems 8 of the database system 1 are generally allowed to access the newly added data record. This determination e.g. utilizes general access allowance rules of the data access systems 8 which define the association criteria.

This may be implemented in various ways. For example, a data access system 8 may setup a number of criteria specifying characteristics of data records 6 to which access should generally be possible by the data access system 8. The data access system 8 may the criteria at a location accessible by the database server 2. When a new data record 6 is added to the database 5, the database server 2 checks the general access allowance rules constituted by the criteria of the various data access systems 8 and determines which data access system 8 should generally be allowed to access the new data record. The database server 2 then updates the associations 3 accordingly, e.g. by inserting the identifiers of the respective data access systems 8 in the corresponding field of the data record (data access systems A and D in the example of FIG. 7). The database server 2 may then inform those data access systems 8 with general access according to the definitions of associations 3. To this end, in some embodiments, the database server 2 sends a notification to the data access systems 8 which have been associated with the particular data record in accordance with updated associations 3 to indicate the presence of the particular data record 8 in the database 5.

According to other implementations, the database 5 and/or the database server 2 publish information about newly added and stored data records 6 to the data access systems 8, and the data access systems 8 determine, on the basis of the aforementioned criteria, to which data records to register for general access. The data access systems 8 then return an indication to the database server 2 for which of the newly added and stored data records general access should be allowed, and the database server 2 updates the associations 3 accordingly, as described above. The database server 2 may then return an acknowledgement to the data access systems 8 about their new entries for the added data records 6 in the updated associations 3. In these implementations, the aforementioned notification to indicate the presence of the newly stored particular data record 6A may be constituted by the publication of the information about the newly added data record(s) 6 and the acknowledgement.

The messages employed by the procedure shown in FIGS. 2 to 6 may have a common data structure with fields (information elements) such as message type, data record identification, time period identification, data access system identity, cause of the message, and others, defined by a protocol specification at the application layer of the OSI reference model and implementable by the skilled person given requirements of the particular use case.

In some embodiments, the exclusive access times inventory 4 is implemented as a cache in order to allow faster determination of the time periods which are still available for exclusive access, compared to storage in a standard database. In some embodiments, the exclusive access times inventory 4 is implemented as a part of the database 5. For example, a database table specifies for each of the data records 6 (e.g. using the data record identifier of FIG. 7 as a key) which data access system 8 has been granted exclusive access for which time periods and which time periods are still free. In some embodiments, the exclusive access times inventory 4 may be implemented using a calendar application already providing time management services.

The mechanisms described above can be advantageously applied in various use cases. For example, they may be utilized in a state-of-the-art database system to manage write access to the same data records from multiple clients over time in a deterministic way, thereby avoid (or at least decrease) concurrent write accesses and, thus, improve write access efficiency.

Further or other use cases may be directed to promoting access efficiency to data records which are stored in multiple locations, such as multiple geographically distributed instances of the database 5. In such architectures, the database server 2 may ensure that only one version of the data records stored in multiple locations is modified at a time, in order to avoid inconsistency and potentially costly (in terms of computing resources and time) conflict resolutions mechanisms. Various other database technology use cases are encompassed.

Figure 8:
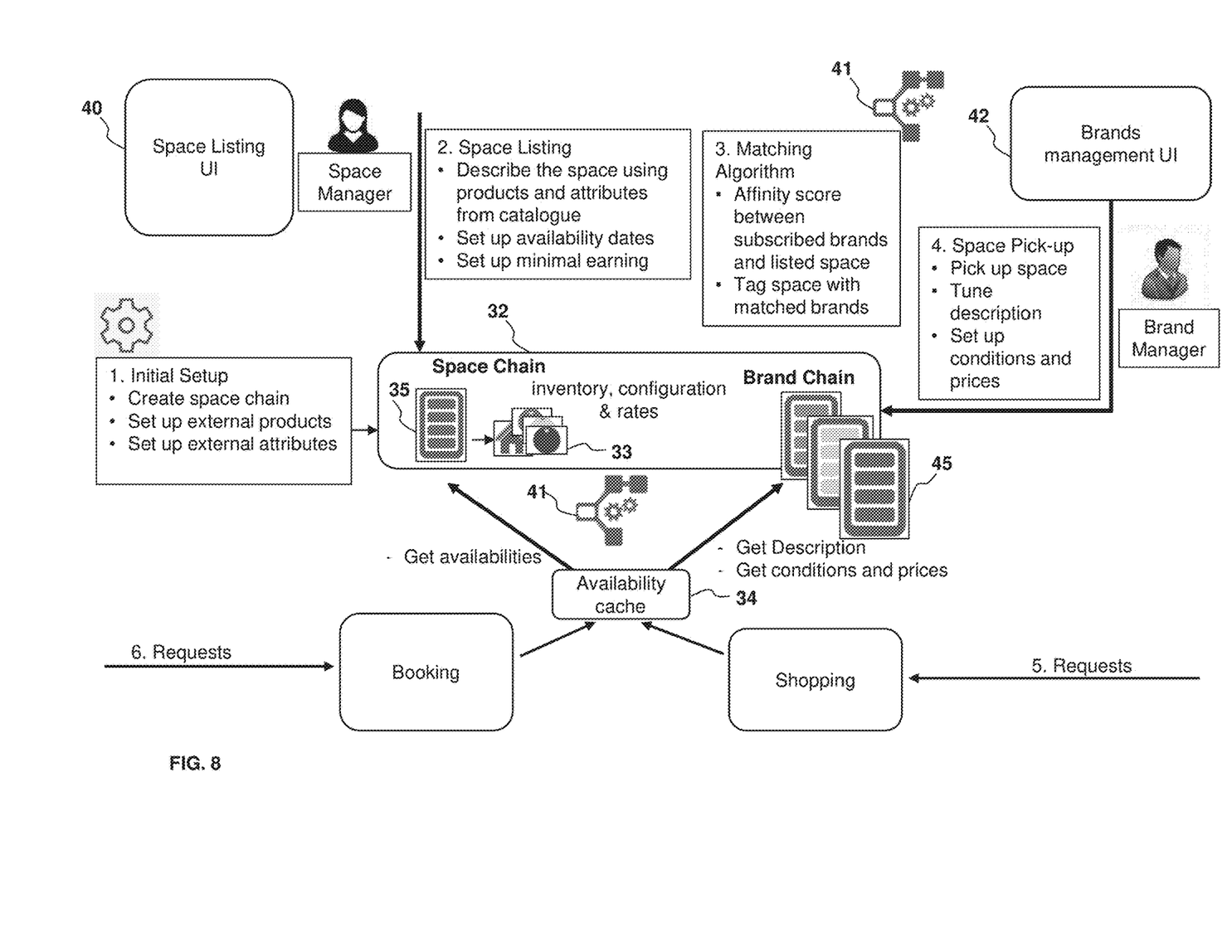
FIG. 8 relates to a non-limiting use case of a reservation system.

A further envisaged use case relates to a reservation system in which the data records represent reservable or bookable entities such as apartments, vacation homes, villas, mobilomes, and others, hereinafter generally referred to as spaces. Such reservable entities may logically extend provider entities with other native reservable entities such as a hotel or a hotel chain offering native rooms to be rented for periods of time in an on-demand-manner. An exemplary implementation of this use case is schematically shown by FIG. 8.

In this use case, the database server 2 is represented by a central module 32 called inventory, configuration and rates. Characteristics of the spaces are stored in the space chain 35 which is a repository forming a part of the database 5 as described above. The space chain 35 with a corresponding data structure is created in a first set of activities, an initial setup procedure. The system includes a space listing user interface (UI) 40 which, in a second set of activities, allows a human or automated space manager to generate the content of the space chain (space listing), i.e. a number of data records specifying attributes of the spaces. Non-limiting examples of such attributes are number of sleeping rooms, existence of a kitchen, a balcony or terrace, possibility of sea view, type of bed(s), and others.

The space chain 35 may also include space availability dates. The space manager may specify the dates when a space is generally available for rental (e.g. weekends only), or specify dates when the space is generally unavailable. Further rules may also be defined and stored in the space chain, such as restriction rules (e.g. maximum number of people, pets, etc.), pricing conditions (e.g. rate plans). Optionally, prices may be defined specific for each hotel chain where the space is to be represented. The space manager may also have the option to set a minimum price to be guaranteed by daily rental. If this option is not set, the space may be rented given the market price, without any guarantee of a minimal revenue.

The space listing activities may be performed each time a new space becomes available to the system or definitions of already existing spaces are to be adapted. The space chain 35 enables the spaces represented by the data records stored in the space chain 35 to be registered (picked up) by hotels or hotel chains (brands, forming data access systems 8 set forth above) for on-demand rental (dynamic branding), as described next.

A third set of activities is implemented by a matching algorithm 41. The matching algorithm 41 couples spaces with hotels or hotel chains (brands) based on the space data stored in the space chain 35 described above as well as rules prescribed by the brands, e.g. definitions of types and characteristics such as rental prices of apartments of interest. The latter may be stored in a brand chain 45. e.g. a brand chain 45 for each brand known in the system, hosted by the central module 32 as well. The matching algorithm 41 may calculate affinity scores between spaces listed in the space chain 35 and brands in order to determine which brand might be generally allowed to book which space for which dates. The affinity scores may be calculate based on at least one of a given training data, a given a list of grands, given space details (localization and further attributes). The affinity scores may result in associations 33 between spaces (data records) and brands (data access systems) as described above, i.e. identifiers of brands (tags) may be stored at least as a logical part of the space chain 35.

The associations 33 may be confirmed on behalf of a brand by a human or automated brand manager in a fourth set of activities. Spaces with high affinity score resulting from the matching algorithm 41 may be suggested to the brand manager for positive confirmation (pick-up). The brand manager may also be responsible for specifying the data and rules employed by the brands, such as characteristics of spaces of interest, prices, brand names, local contact point, business model conditions, and others. These activities may utilize a brands management user interface (UI) 42. The brands management UI 42 may display generally allowed spaces to the given brand, enable space pick-up, description of spaces of interest, set price and conditions via a rate plan, set additional restrictions employed by the brand in addition to the conditions already prescribed by the space manager (e.g. in addition to "weekend only", the brand may specify "holiday weekends only"), further tune picked-up space for the brand, e.g. by personalizing descriptions, prices and conditions, and others.

The aforementioned sets of activities produce an availability cache 34 (corresponding to the exclusive access inventory 4 as described above). The availability cache 34 forms a functional part of the central module 32 and specifies which space is still un-booked or un-reserved at which periods of times, such as days. Note that although FIG. 8 shows the availability cache 34 as a separate element of the system, the availability cache 34 may also be implemented within the space chain 35. The availability cache 34 is updated at each booking modification (corresponding to activity 13 of FIG. 2), or availability rules change. In this way, at shopping/reservation time, the availability cache 34 ensures availability and booking consistency for the spaces forming a multi-represented inventory as the spaces are bookable/rentable for a plurality of brands.

A fifth and/or a sixth set of activities may be employed in response to shopping requests and/or booking requests, respectively (corresponding to the data access requests 10 described above). These requests may originate from one of the brands or from any third parties such as travel agencies, travel platforms, travellers, etc. through the brands. Generally, at shopping/reservation time, spaces that are generally available for a brand and which have not yet been booked by the brand or any other brand may be booked or reserved for the brand by utilizing the availability cache 34. In response to an shopping request or a booking process, the following orchestration may be performed by the central component 32: the brand chain 45 is queried to obtain any conditions of the brand for the current shopping or booking request, such as rates restrictions, and the space chain 35 is queried in order to identify spaces which have been picked-up by the brand (corresponding to a determination 11 of general access allowance as described above). Actual availability of any identified spaces is matched against a time period indicated in the shopping or booking request based on the availability cache 34 (corresponding to activity 12 of FIG. 2).

Actual reservations are reflected by respective updates in the availability cache 34 that defines which reservable entity has already been reserved for which of the provider entities for which time periods. Optionally, information concerning actual reservations may also be stored in the respective brand chain 45. In this way, the present methodologies can be utilized to provide an integrated in hospitality and content request service (CRS) management UI to promote conflict-free reservations and bookings. Note that the aforementioned use case is a non-limiting example and may be transferred to other bookable or reservable entities.

Figure 9:
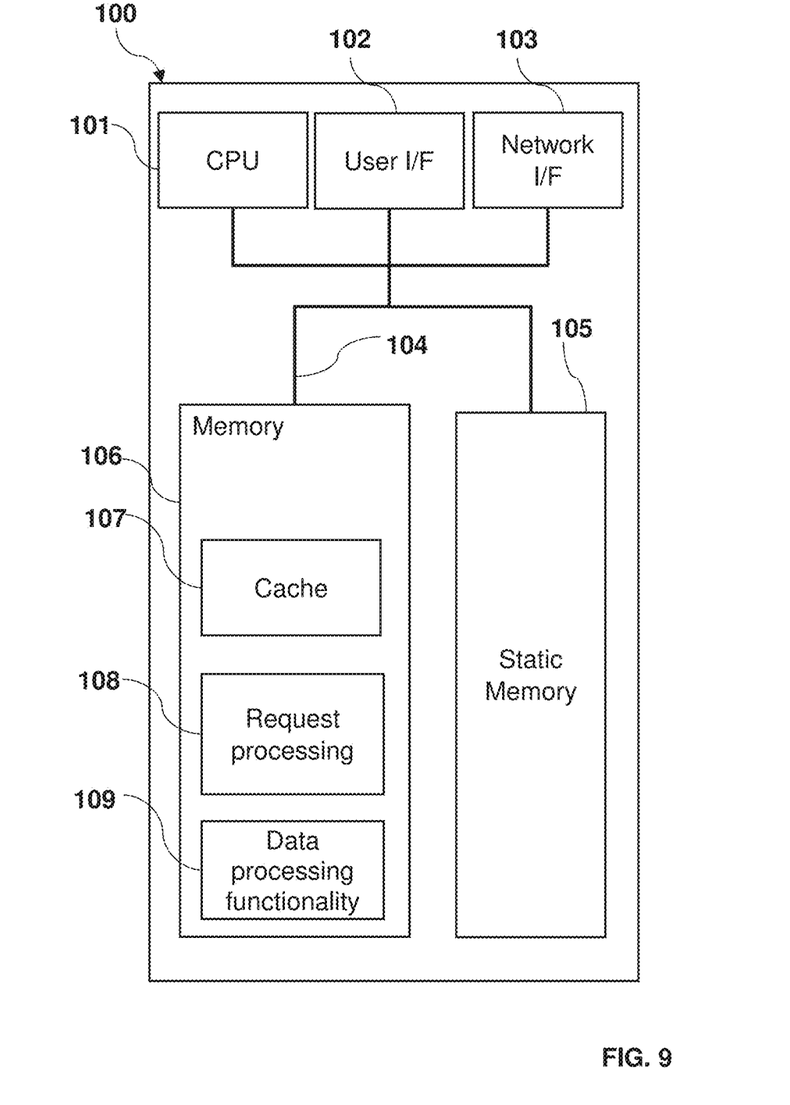
FIG. 9 shows an internal structure of components of a database server arranged to perform the mechanisms taught herein.

FIG. 9 is a diagrammatic representation of the internal component of a computing machine 100 implementing the functionality of the database server 2. Similar computing machines may also realize one or more of the data access systems 8, as well as the database 5 described above. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 implementing the database server 2 to the other components of the database system 1 such as the data access systems 8 and the database 5, or any further components.

Computing machine 100 includes a memory 106 such as main memory, random access memory (RAM) and/or any further volatile memory. The memory 106 may store temporary data and program data to facilitate the functionality of the database server 2. For example, the database server 2 may maintain a cache 107 storing data records 6 recently retrieved from the database 5. The memory 106 may also store computer program data 108 to implement the functionality to process the requests from the data access systems 8 as explained above. The memory 106 may also temporarily store the data 109 constituting context or state data of the database server 2, e.g. to keep the data readily available for potential follow-up requests, e.g. a follow-up access request with an adjusted time period as described above with reference to FIG. 5.

A set of computer-executable instructions (computer program code 108) embodying any one, or all, of the methodologies described herein, resides completely, or at least partially, in or on a machine-readable storage medium, e.g., the memory 106. For example, the instructions 108 may include software processes implementing the request processing functionality of the database server 2, to query and update the associations 3 and the exclusive access inventory 4. The instructions 108 may implement the functionality of receiving and responding to database requests from the data processing systems 8, as well as querying the databases 5 and retrieving data records from the database 5.

The instructions 108 may further be transmitted or received as a propagated signal via the Internet through the network interface device 103 or via the user interface 102. Communication within computing machine is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

The invention claimed is:

1. A database consistency method implemented by a database server implementing a reservation engine, the database server communicatively coupled to a database storing multiple data records representing reservable entities, the method comprising:
 storing (i) associations of the data records with data access systems corresponding to provider entities with other native reservable entities, the associations defining which data records each data access system is allowed to access, and (ii) an exclusive access times inventory defining which of the data access systems with allowed access according to the associations has been granted exclusive access to which data records for which time periods, wherein the exclusive access times inventory implements an availability cache, and wherein exclusive access to a data record indicates that a corresponding reservable entity has already been reserved by a corresponding provider entity;

receiving a first request from a first one of the data access systems, the first request indicating (i) a particular one of the data records, and (ii) a first time period, wherein the first request defines a shopping or booking request to reserve at least one reservable entity on behalf of the corresponding provider entity for the first period of time;

checking the stored associations to determine whether the first data access system is allowed to access the particular data record;

in response to determining that the first data access system is allowed to access the particular data record, checking the exclusive access times inventory to determine whether another of the data access systems has been granted exclusive access to the particular data record for another time period overlapping with the first time period;

in response to determining that no other data access system has been granted exclusive access to the particular data record for another time period overlapping with the first time period, updating the exclusive access times inventory to grant the first data access system exclusive access to the particular data record for the first time period, and to exclude all other data access systems from access to the particular data record for the first time period; and in response to receiving a second request from a second data access system of the data access systems requesting exclusive access to the particular data record for a second time period including at least sub-period of the first time period, determining, based on the updated exclusive access times inventory, that exclusive access is not available for the second time period and returning a denial notification to the second data access system.

2. The method of claim 1, wherein the denial notification includes an indication of one or more sub-periods of the second time period in which exclusive access is still available according to the exclusive access times inventory.

3. The method of claim 1, wherein the associations are stored as one or more data access system identifiers within a data structure of the data records, wherein each data access system identifier indicates one of the data access systems that is allowed to generally access the respective data record.

4. The method of claim 1, further comprising:
after an initial storage of the particular data record in the database, updating the associations to define which of the data access systems is allowed to generally access the particular data record based at least on association criteria prescribed by the data access systems.

5. The method of claim 4, further comprising:
sending a notification to the data access system which have been associated with the particular data record in accordance with updated associations to indicate the presence of the particular data record in the database.

6. A database server implementing a database consistency mechanism for a reservation engine, the database server being communicatively coupled to a database storing multiple data records representing reservable entities, the database server comprising:

a network interface connecting the database server with data access systems corresponding to provider entities with other native reservable entities; and a processor configured to:
store (i) associations of the data records with the data access systems, the associations defining which data records each data access system is allowed to access, and (ii) an exclusive access times inventory defining which of the data access systems with allowed access according to the associations has been granted exclusive access to which data records for which time periods, wherein the exclusive access times inventory implements an availability cache, and wherein exclusive access to a data record indicates that a corresponding reservable entity has already been reserved by a corresponding provider entity;

receive a first request from a first one of the data access systems, the first request indicating (i) a particular one of the data records, and (ii) a first time period, wherein the first request defines a shopping or booking request to reserve at least one reservable entity on behalf of the corresponding provider entity for the first period of time;

check the stored associations to determine whether the first data access system is allowed to access the particular data record;

in response to determining that the first data access system is allowed to access the particular data record, check the exclusive access times inventory to determine whether another of the data access systems has been granted exclusive access to the particular data record for another time period overlapping with the first time period;

in response to determining that no other data access system has been granted exclusive access to the particular data record for another time period overlapping with the first time period, update the exclusive access times inventory to grant the first data access system exclusive access to the particular data record for the first time period, and to exclude all other data access systems from access to the particular data record for the first time period; and in response to receiving a second request from a second data access system of the data access systems requesting exclusive access to the particular data record for a second time period including at least sub-period of the first time period, determine, based on the updated exclusive access times inventory, that exclusive access is not available for the second time period and returning a denial notification to the second data access system.

7. The database server of claim 6, wherein the denial notification includes an indication of one or more sub-periods of the second time period in which exclusive access is still available according to the exclusive access times inventory.

8. The database server of claim 6, wherein the associations are stored as one or more data access system identifiers within a data structure of the data records, wherein each data access system identifier indicates one of the data access systems that is allowed to generally access the respective data record.

9. The database server of claim 6, wherein the processor is further configured to:
after an initial storage of the particular data record in the database, update the associations to define which of the data access systems is allowed to generally access the particular data record based at least on association criteria prescribed by the data access systems.

10. The database server of claim 9, wherein the processor is further configured to:
send a notification to the data access system which have been associated with the particular data record in accordance with updated associations to indicate the presence of the particular data record in the database.

11. A non-transitory computer readable medium storing computer-executable instructions to be executed by a database server implementing a database consistency mechanism for a reservation engine, the database server being communicatively coupled to a database storing multiple data records representing reservable entities, execution of the instructions configuring the database server to:
store (i) associations of the data records with data access systems corresponding to provider entities with other native reservable entities, the associations defining which data records each data access system is allowed to access and (ii) an exclusive access times inventory defining which of the data access systems with allowed access according to the associations has been granted exclusive access to which data records for which time periods, wherein the exclusive access times inventory implements an availability cache, and wherein exclusive access to a data record indicates that a corresponding reservable entity has already been reserved by a corresponding provider entity;
receive a first request from a first one of the data access systems, the first request indicating (i) a particular one of the data records, and (ii) a first time period, wherein the first request defines a shopping or booking request to reserve at least one reservable entity on behalf of the corresponding provider entity for the first period of time;
check the stored associations to determine whether the first data access system is allowed to access the particular data record;
in response to determining that the first data access system is allowed to access the particular data record, check the exclusive access times inventory to determine whether another of the data access systems has been granted exclusive access to the particular data record for another time period overlapping with the first time period;
in response to determining that no other data access system has been granted exclusive access to the particular data record for another time period overlapping with the first time period, update the exclusive access times inventory to grant the first data access system exclusive access to the particular data record for the first time period, and to exclude all other data access systems from access to the particular data record for the first time period; and
in response to receiving a second request from a second data access system of the data access systems requesting exclusive access to the particular data record for a second time period including at least sub-period of the first time period, determine, based on the updated exclusive access times inventory, that exclusive access is not available for the second time period and returning a denial notification to the second data access system.

12. The non-transitory computer readable medium of claim 11, wherein the denial notification includes an indication of one or more sub-periods of the second time period in which exclusive access is still available according to the exclusive access times inventory.

13. The non-transitory computer readable medium of claim 11, wherein the associations are stored as one or more data access system identifiers within a data structure of the data records, wherein each data access system identifier indicates one of the data access systems that is allowed to generally access the respective data record.

14. The non-transitory computer readable medium of claim 11, wherein execution of the instructions further configures the database server to:
after an initial storage of the particular data record in the database, update the associations to define which of the data access systems is allowed to generally access the particular data record based at least on association criteria prescribed by the data access systems.

15. The non-transitory computer readable medium of claim 14, wherein execution of the instructions further configures the database server to:
send a notification to the data access system which have been associated with the particular data record in accordance with updated associations to indicate the presence of the particular data record in the database.

* * * * *